United States Patent [19]

Nishiguchi

[11] 4,368,382

[45] Jan. 11, 1983

[54] APPARATUS FOR COUNTING ARTICLES USING TORQUE

[75] Inventor: Yuzuru Nishiguchi, Higashi, Japan

[73] Assignee: Shinko Denshi Company Limited, Tokyo, Japan

[21] Appl. No.: 203,192

[22] Filed: Nov. 3, 1980

[30] Foreign Application Priority Data

Apr. 10, 1980 [JP] Japan .................................. 55-47106

[51] Int. Cl.$^3$ .............................................. G06G 7/00
[52] U.S. Cl. ............................ 235/92 PK; 235/92 CA; 235/92 PC; 324/71 CP; 364/555
[58] Field of Search ....... 235/92 CA, 92 MS, 92 MT, 235/92 NT, 92 PC, 92 PK; 324/71 CP; 340/673, 674; 364/555

[56] References Cited

U.S. PATENT DOCUMENTS

| | | | |
|---|---|---|---|
| 2,914,246 | 11/1959 | Beamish | 235/92 PK |
| 3,104,318 | 9/1963 | Hill et al. | 235/92 NT |
| 3,789,202 | 1/1974 | Yamanaka | 364/555 X |
| 3,900,718 | 8/1975 | Seward | 235/92 PC X |
| 3,936,741 | 2/1976 | Coulter et al. | 235/92 PC X |
| 4,021,117 | 5/1977 | Göhde et al. | 235/92 PC X |

Primary Examiner—Robert B. Reeves
Assistant Examiner—Edward M. Wacyra
Attorney, Agent, or Firm—Lawrence I. Field

[57] ABSTRACT

An apparatus for counting the number of articles of the same kind comprising a measuring chute rotatably journalled to a horizontal shaft and being arranged in an inclined manner, a parts-feeder for supplying the articles onto the measuring chute substantially at a point of the horizontal shaft, a load detector for detecting torque generated on the horizontal shaft when the articles supplied on the measuring chute are discharged from the chute at its lower end remote from the horizontal shaft to produce a torque output and a measuring circuit including a circuit for detecting peaks in the torque output to produce pulses and a counter for counting the number of peaks.

9 Claims, 22 Drawing Figures

→ Time t

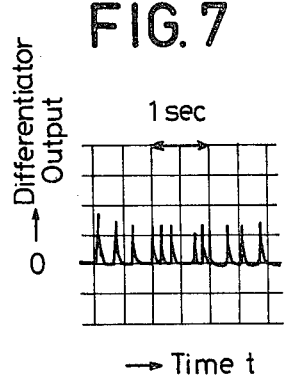
FIG. 7
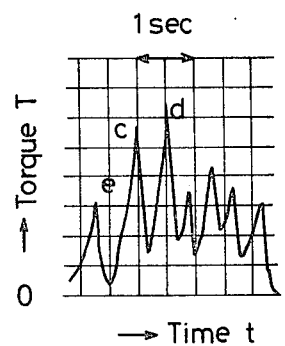
FIG. 8
FIG. 9
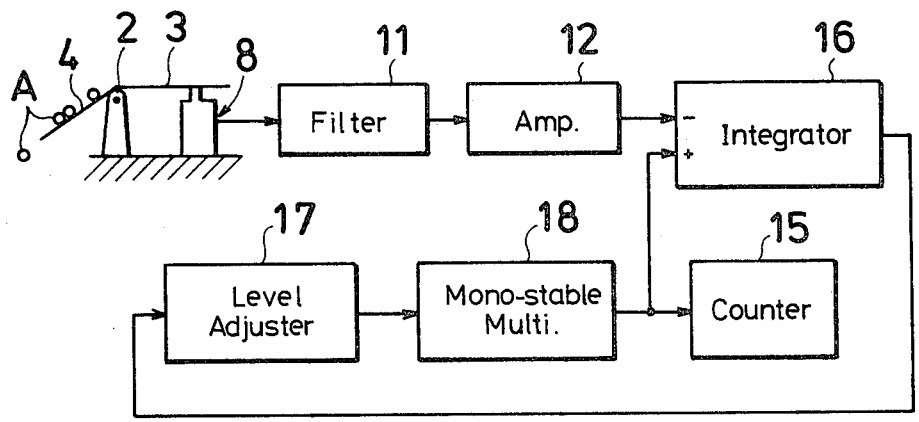

FIG.10(a) Torque T 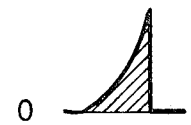
FIG.10(b) Integrated Torque 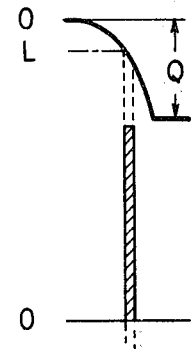
FIG.10(c) Rectangular Wave
FIG.10(d) Integrated Rectangular Wave 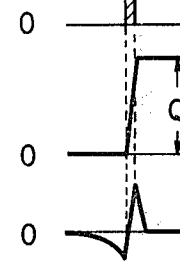
FIG.10(e) Integrator Output 
→ Time t
FIG.11(a) FIG.11(b)
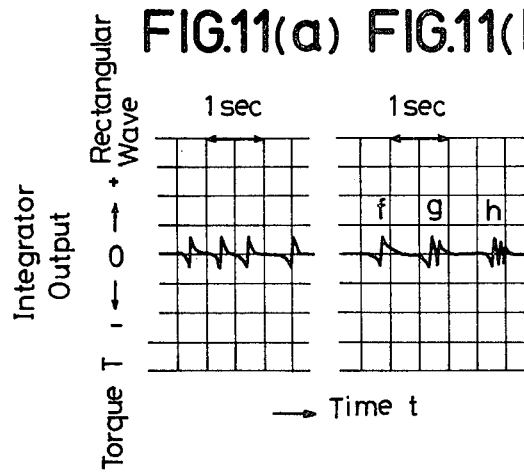

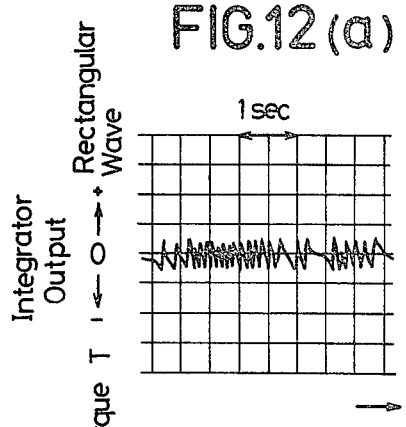
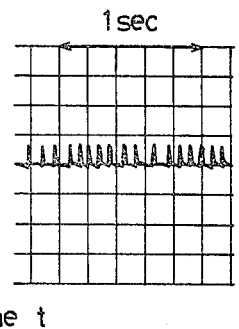
FIG.12(a)   FIG.12(b)
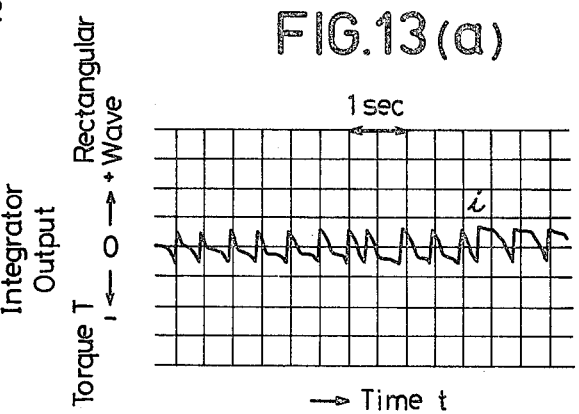
FIG.13(a)
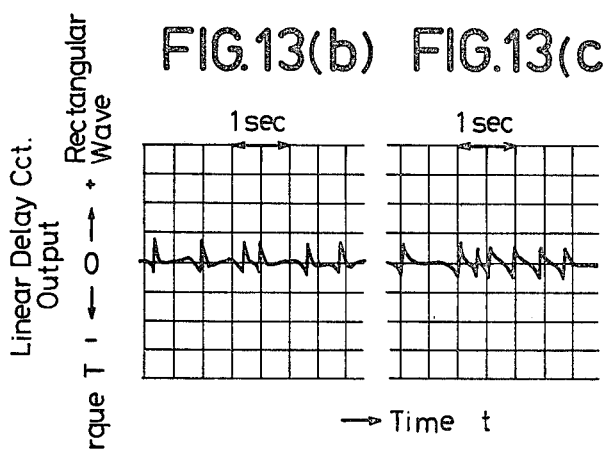
FIG.13(b)   FIG.13(c)

explaining the operational principle of the apparatus shown in FIG. 1, the torque will be analyzed using equations. As shown in FIG. 2 when a mass point having a weight m slides downwards due to gravity along an inclined surface having an angle $\theta$ with respect to a horizontal plane an equation of motion can be expressed by the following equation.

$$m\ddot{x} = mg \sin \theta - pmg \cos \theta$$

$$\ddot{x} = g(\sin \theta - p \cos \theta) \ldots \quad (1)$$

wherein x denotes a position of the mass point, p is a frictional coefficient between the mass point and the inclined surface and g represents the gravity. When the equation (1) is integrated twice with respect to time t, the following equation (2) expressing a relation between x and t can be obtained under the initial condition that at t=0, both initial speed x and initial distance x are zero.

$$x = (\tfrac{1}{2})g(\sin \theta - p \cos \theta)t^2 \ldots \quad (2)$$

From this equation (2) it is noted that the distance x of the sliding article can be expressed by a quadratic curve for time t. The measuring chute 4 shown in FIG. 1 corresponds to the inclined surface in FIG. 2. When the article A is introduced onto the measuring chute 4 near the horizontal shaft 2, the article begins to slide from this position x=0 and is discharged from the chute 4 at its lower end. Then the torque T generated around the horizontal shaft 2 can be given by the following equation.

$$\begin{aligned} T &= x \, m \, g \cos \theta \\ &= (\tfrac{1}{2}) m \, g^2 \cos \theta \, (\sin \theta - p \cos \theta) \, t^2 \end{aligned} \quad (3)$$

From this equation (3), the torque T around the horizonal shaft 2 which is measured by the load detector 8 is a quadratic curve with respect to time t like as the equation (2) and returns to zero as soon as the article A is discharged from the measuring chute 4.

FIG. 3 shows a waveform of the torque output of the detector 8 when the articles A are successively supplied onto the measuring chute 4 at an interval of about one second. Since the articles A are supplied onto the measuring chute 4 near the horizontal shaft 2 from a point which is very close to the chute, any shock and vibration which might be produced upon the supply of articles, could not be almost converted into torque, and thus could not affect the torque output i.e. the counting operation. As can be seen from the graph of FIG. 3 the measured torque T does not return to zero instantaneously at the discharge of the article A from the chute, but it requires about 0.1 seconds. This is due to an internal delay of a measuring system, particularly a delay of a filter. But it can be fully certified that the measured torque reproduces the theoretical torque T expressed by the equation (3) in a faithful manner. When the successive articles A are supplied onto the measuring chute 4 at such a suitable interval that more than two articles could not be simultaneously existent on the chute, the torque output shown in FIG. 3 are obtained. In such a case it is quite easy to count the number of articles A. For instance, a threshold level which is equal to about 80% of a peak value of the torque output has been previously set and the number of times of occasions that the torque outputs exceeds said threshold level is counted. However, this counting method with the threshold level equal to about 80% a of the peak value of the torque output produced by the single article A, could not be applied to such a case that although the articles A are separated from each other, two or three articles may be simultaneously present on the measuring chute 4 as shown in FIG. 1. In this case there might be obtained a torque output having a waveform shown in FIG. 4.

According to one aspect of the torque output treating operation in the counting apparatus of the invention, it is recognized that the torque T returns theoretically to zero from the maximum value upon the discharge of the articles from the measuring chute 4 so that the waveform of the torque output has extremely sharp peaks. In this manner it is possible to identify the passages of the respective articles along the measuring chute 4 to count the number of articles. In one embodiment of such a measuring circuit the output waveform of the torque T from the load detector 8 is differentiated and shaped to produce pulsatory outputs of small width and the number of these output pulses is counted.

FIG. 5 is a circuit for illustrating a first embodiment of the measuring circuit for carrying out such a process. In FIG. 5 the torque output T produced by the load detector 8 is supplied through a filter 11 and an amplifier 12 to a differentiator 13 and an output from the differentiator device is supplied by means of a half-wave rectifier 14 to an electronic counter 15. The output signal from the differentiator 13 appearing at a point a is shown in FIG. 6(a). As the case may be, this output signal can be directly counted, but in order to effect more accurate counting, negative portion of the output signal from the differentiator are cut by the half-wave rectifier 14 to obtain at a point b a simplified differential pulses as shown in FIG. 6(b). These pulses are counted by the electronic counter 15 to count the number of articles in an easy and accurate manner. It should be noted that due to chracteristics of the differentiator 13 used in an experiment, the polarity of the differentiated output shown in FIG. 6 does not correspond to that of the torque output illustrated in FIGS. 3 and 4, but is reversed thereto.

In FIG. 6 the differentiated output is shown when the articles A are supplied to the measuring chute 4 at a relatively small rate such as one article per second. FIG. 7 shows differentiated output pulses which are obtained when the articles are supplied at a higher rate such as about four articles per second. As can be seen from FIG. 1 three or more articles A may be simultaneously present on the measuring chute 4, and even if the articles A are supplied at a small interval of about 0.15 seconds, the respective articles can be separately detected positively as shown in FIG. 7. From FIGS. 3, 4 and 6 it is assumed that the article A is existent on the measuring chute 4 for about 0.7 seconds, and thus if the articles A are supplied successively onto the chute substantially at an equal interval at a rate of six articles per second, the counting may be effected accurately.

Next a problem which might arise when a plurality of articles A pass through and are discharged from the measuring chute 4 at the same or substantially same time will be explained. FIG. 8 is a waveform showing the torque output T when nine articles A are supplied to the chute. Pulse peaks c and d indicate that two articles are simultaneously discharged from the measuring chute 4. In such a case if the counting circuit shown in FIG. 5 is used as it were, an erroneous count of seven might be

APPARATUS FOR COUNTING ARTICLES USING TORQUE

BACKGROUND OF THE INVENTION

The present invention relates to an apparatus for counting a great number of articles of same kind.

In manufacture process or circulating process of articles it is sometimes required to count the number of articles of same kind. It has been known to detect the number of articles by dividing the total weight of total articles to be counted by a unit weight of a single article. This counting apparatus utilizes a fact that the articles of the same kind have the same weight. However such a counting apparatus produces a counting error which could never be avoided theoretically due to difference in weight of respective articles, and also can be applied only to a static measurement, but could be hardly applied to a dynamic measurement during a manufacture of articles or feeding of articles for packing them separately.

In known dynamic counting method the respective articles are detected either optically by projecting a light beam upon articles passing through a given measuring point, or electromagnetically by means of an access switch depending upon material of articles. However in these known counting methods an accurate count value could not be obtained unless the respective articles are delivered separately so as to detect the articles one by one, and thus a relatively complicated and expensive parts-feeder must be provided and further a counting speed could not be so increased. Particularly in the optical method if articles are transparent or have a flat or complicated shape, a counting error might be produced in dependence upon attitude of articles passing through the measuring point. Further complicated articles such as coiled springs which are liable to be twisted together and could hardly be fed separately could not be counted by known counting apparatuses.

SUMMARY OF THE INVENTION

The present invention has for its object to provide an apparatus for counting articles, which apparatus can obviate the above mentioned disadvantages of the known counting apparatuses and can count accurately the number of articles under various conditions that the respective articles have differences in weight, shape and attitude at a measuring station.

It is another object of the invention to provide an article counting apparatus which can count positively the number of articles even if a plurality of articles might pass through the measuring station substantially simultaneously or at a very small interval or might be twisted together.

According to the invention an apparatus for counting the number of articles comprises a measuring chute rotatably journalled to a horizontal shaft at its one end and being arranged in an inclined fashion so that the articles can slide therealong downwards due to gravity; a device for electrically measuring torque generated on said horizontal shaft when the articles pass through the measuring chute to produce a torque output; and a measuring circuit for receiving said torque output to count the number of articles by detecting a variation of the torque output due to the discharge of the respective articles from a lower end of the measuring chute remote from said horizontal shaft.

In a preferred embodiment of the counting apparatus according to the invention said measuring circuit comprises a circuit for receiving said torque output to produce a first area signal representing an area of the torque output, a circuit for generating a second area signal representing an area of the torque output corresponding to a single article, a circuit for comparing said first and second area signals with each other to produce a signal representing the number of articles corresponding to the first area signal and for accumulating the number signal thus produced.

BRIEF DESCRIPTION OF THE DRAWINGS

FIG. 9 is a block diagram showing a second embodiment of a measuring circuit according to the invention;

FIGS. 10 (a) to 10 (e) are waveforms for explaining an operational principle of the second embodiment of the measuring circuit; and FIGS. 11 (a), 11 (b), 12 (a), 12 (b) and 13 (a), 13 (b) and 13 (c) are waveforms for explaining the operation of alternative embodiments of the measuring circuit according to the invention.

DESCRIPTION OF THE PREFERRED EMBODIMENTS

Figure 1:
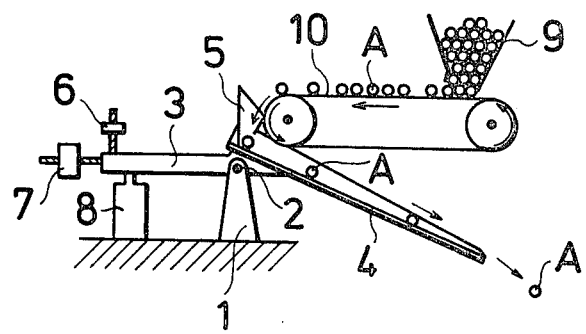
FIG. 1 is a schematic view showing a counting mechanism of an embodiment of an article counting apparatus according to the invention.
Figure 2:
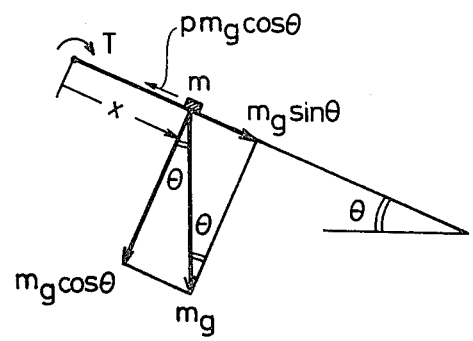
FIG. 2 a schematic diagram for explaining an equation of motion of a mass point sliding down along an inclined surface.

FIG. 1 is a schematic view showing a principal construction of a counting apparatus according to the invention. The apparatus comprises a supporting stand 1 having a horizontal shaft 2 to which is rotatably journalled a beam 3. To one end of the beam 3 is secured a measuring chute 4 in such a manner that the chute is maintained to be inclined by about 20 to 30 degrees with respect to a horizontal plane. Above the measuring chute 4 is arranged a hopper 5 for introducing articles A to be counted onto the chute. At the other end of beam 3 is provided balancing weights 6 and 7. By suitably adjusting the weights the beam 3 may be balanced about the shaft 2. At a middle of the beam 3 is arranged a load detector 8 which can electrically detect torque generated around the horizontal shaft 2 due to the articles A sliding down along the measuring chute 4. In case of the heavy articles use may be made of a load cell comprising strain gauges, and in case of the light articles, an electromagnetic force balancing type load detector may be advantageously used. In order to supply the articles A to the measuring chute 4 through the hopper 5, various kinds of supply devices may be used. For instance, the articles A may be supplied from an article storage hopper 9 by means of a belt conveyor 10 or an electromagnetic feeder.

According to the principle of the present invention torque which is generated around the horizontal shaft 2 due to a force applied to the measuring chute 4 by the article is detected to produce a torque output and the number of peaks in the torque output is counted. Before produced although the real number of articles is nine. As can be imagined by FIG. 8 the peaks c and d of the differentiated output will have amplitudes substantially twice as that of peaks which are produced by the respective single articles. By means of such measure the articles may be distinguished from each other to some extent. But it is sometimes difficult to judge positively that two or three articles are discharged simultaneously particularly when the successive articles are supplied to the measuring chute at a high rate. Next there will be explained one possible solution for counting the number of articles which are supplied at a higher rate, while a plurality of articles may be simultaneously or almost simultaneously discharged from the measuring chute 4 without using a special parts-feeder so that a plurality of articles might be fed as being intertwined with each other.

Figure 3:
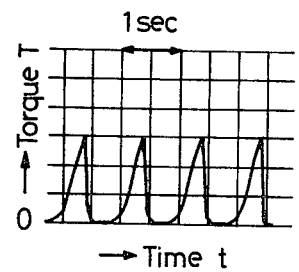
FIGS. 3 and 4 are graphs illustrating a waveform of a torque output from a load detector.
Figure 4:
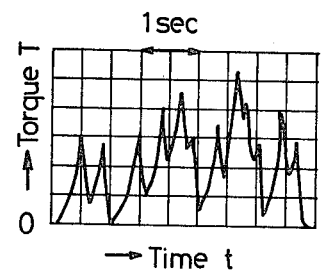

The inventor has found that a total area, i, e. an integrated value with respect to time t of the torque output T corresponding to a plurality of articles As shown in FIGS. 3, 4 and 8 can definitely determine the total number of articles independent of whether they pass through the chute one by one or simultaneously. This fact can be easily understood principally and has been confirmed by tests. For instance, in FIG. 8 though the number of peaks of the torque output T is seven, the total area of the waveform is larger by seven times than an area of a single peak e produced by a single article A. From this fact the number of articles can be determined to be nine. Such a measure can be understood by recognizing the fact that the area of the peaks c and d produced by two simultaneously passing articles is equal to about twice as that of the peak e corresponding to the single article A.

Figure 5:
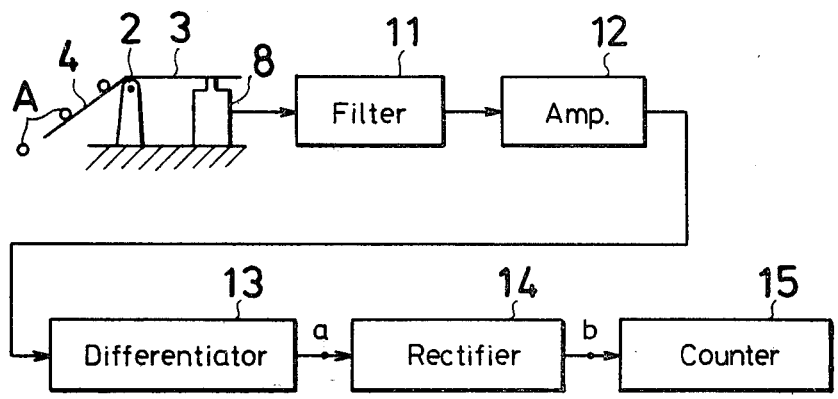
FIG. 5 is a block diagram depicting a first embodiment of a measuring circuit of the counting apparatus according to the invention.
Figures 6A, 6B:
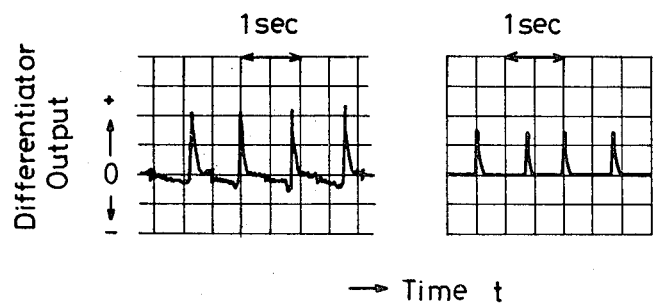
FIGS. 6 (a), 6 (b), 7 and 8 are waveforms of signals generated at various points of the measuring circuit.

FIG. 9 is a circuit diagram showing a second embodiment of the measuring circuit of the apparatus according to the invention in which the number of articles is measured by dividing the area of the torque output by an area of a rectangular pulse which is equal to the area of the torque output corresponding to the single standard article. In this embodiment a torque detecting mechanism including the measuring chute 4, the load detector 8, the filter 11, the amplifier 12 and the electronic counter 15 are the same as or substantially identical with those of the first embodiment illustrated in FIG. 5. The torque output T from the amplifier 12 is supplied to an integrator 16 and an output from the integrator 16 is fedback through a level adjuster 17 to a mono-stable multivibrator 18. The multivibrator 18 produces a rectangular pulse output having given constant amplitude and width and thus a given area corresponding to that of the torque output produced by the single standard article A, when the input voltage to the multivibrator 18 exceeds a predetermined constant value. The rectangular pulse output is integrated by the integrator 16 and is also supplied to the electronic counter 15. In this manner the two kinds of input signals, i.e. the torque output T and the rectangular pulse output are supplied to the integrator 16 at opposite polarity inputs thereof. That is, these signals are supplied in a differential manner to the integrator.

Now the operation of the second embodiment will be explained. When a single article A passes through the measuring chute 4, there is produced a torque signal T shown in FIG. 10(a) from the amplifier 12 and this output is supplied to an inverted input (shown by −sign) of the integrator 16. Then the integrator 16 produces an integrated torque output shown in FIG. 10(b). This integrated torque output is supplied through the level adjuster 17 to the mono-stable multivibrator 18. When the output exceeds the predetermined reference value L set by the level adjuster 17, the multivibrator 18 produces a rectangular pulse shown in FIG. 10(c). This rectanguler pulse is counted by the electronic counter 15 and at the same time is supplied to a non-inverted input (shown by +sign) of the integrator 16. Then the integrator produces a rectangular integrated output illustrated in FIG. 10(d). In an actual apparatus since circuit constants are so determined that the area of the torque output T shown in FIG. 10(a) is made equal to the area of the rectangular signal depicted in FIG. 10(c), after an article A passed through the chute the amplitude Q of the integrated torque output (b) coincides with the amplitude Q' of the integrator output (d) and an actual output from the integrator 16 shows a difference between the outputs (b) and (d) (arithmatic sum) as shown in FIG. 10(e), because the integration of the rectangular wave in the integrator 16 is initiated at an intermediate instance of the integration of the torque output T and comes to an end within a small time.

FIG. 11 shows waveforms of the output from the integrator 16 in the actual apparatus of the above explained second embodiment. The waveform shown in FIG. 11(a) is quite similar to the theoretical waveform illustrated in FIG. 10(e) and is obtained when the articles pass through the measuring chute separately one by one. The waveform of FIG. 11(b) was obtained by passing the articles A with being twined together by two and three articles for comparing the operation of the apparatus in case of a plurality of articles being passed through the chute simultaneously. In FIG. 11(b) a portion f represents a passage of single article, portions g and h simultaneous passages of two and three articles. It has been recognized that the rectangular pulses are produced in dependence upon the number of articles.

In this manner according to the second embodiment shown in FIG. 9, by feeding back the output from the integrator 16 through the level adjuster 17 to the mono-stable multivibrater 18, when the area of the waveform of the torque output T is sufficiently larger than an area of the rectangular signal, i,e. the set level L (the value corresponding to, for example one quarter of the article), there is produced the rectangular signal sufficient for decreasing the output from the integrator 16 to zero after the passage of articles, and the number of rectangular pulses is counted by the electronic counter 15 as the number of articles. Therefore, even if a plurality of articles A pass through the measuring chute 4 substantially simultaneously or together, the total number thereof can be correctly counted.

FIG. 12 is a graph showing an actual operation in which the articles A had been passed through the measuring chute at a high rate. FIG. 12(a) shows the output from the integrator 16 and FIG. 12(b) the rectangular output from the mono-stable multivibrator 18. In the second embodiment under a very high rate such as more than ten articles per second, the very accurate counting can be carried out.

The counting operation based on the above explained principle of subtraction of rectangular signal is equivalent to divide the total area of the torque output T by the area of the torque output corresponding to the single standard article and thus there might be produced a fraction within one count as the result of division. Therefore in case of counting a great number of articles if fractions are accumulated in either one polarity positive or negative, there might be produced a counting error. The following factors may be considered for producing fractions as the result of subtraction.

(1) The respective articles A have different weights.

(2) Even if the weight and appearance of the respective articles are constant, the speed and attitude of respective articles sliding along the measuring chute 4 become different due to slight differences in attitude, direction, impact shock, repellence of respective articles upon the supply onto the chute as well as in sliding paths, and thus the waveform of detected torque T and its area are different for respective articles.

(3) Measuring errors are existent in various sections of the apparatus.

In order to avoid the erroneous counting under the existence of the above mentioned various errors, it is sufficient to reduce or compensate the integrator output to zero or substantially zero as soon as the articles leave the measuring chute 4 before the accumulation of successive errors reaches the level L corresponding to a quarter of the article. In a concrete method, for instance, the conveyor 10 shown in FIG. 1 is operated intermittently to supply a relatively small number of articles such as twenty articles and the number of articles is counted by the apparatus of the second embodiment shown in FIG. 9. After counting, the conveyor 10 is driven again after the output of the integrator 16 is compensated to zero level. By repeating the similar process the number of articles can be counted correctly with removing the counting error due to the above fractions. However, in this method the counting speed could not be made high.

Another useful method is to provide means for compensating the integrator output to zero within a small time in an analogous and continuous manner. This can be very simply achieved by replacing the integrator 16 by a first-order lag circuit. It has been known by those skilled in the art that the first-order lag circuit is much easily handled than the integrator and can be simply constructed only by connecting a suitable resistor across an integrating capacitor of the integrator 16. FIG. 13 shows experimental results of the apparatus in which the erroneous count due to the accumulation of fractions produced by the division can be simply and positively removed by using the first-order lag circuit instead of the integrator. FIG. 13(a) shows an output of the integrator 16 which has been constructed as a pure integrating circuit. In order to produce intentionally the erroneous count for the purpose of experiment, the apparatus was so adjusted that the area of the rectangular pulse is made smaller than that of the torque output T. As can be seen from the graph the fractional areas equal to difference between the area of the rectangular pulse and that of the torque output are accumulated to produce an additional rectangular pulse at an instant i before a twelfth article A is supplied, because the integrator output reaches the reference level L set by the level adjuster 17 after the integration of a torque output of an eleventh article A. Thus the count value becomes twelve, although the actual number of articles is eleven. Contrary to this in the embodiment shown in FIG. 13 (b) in which the integrator has been changed into the first-order lag circuit having a time constant of about 0.05 seconds by connecting a suitable resistor across the integrating capacitor, although an output from the first-order lag circuit is deviated toward the torque output because the area of the torque output T is larger than the area of the rectangular pulse, the delayed output returns to zero level. In this manner, even if the areas of the torque output and rectangular pulse differ from each other by about 5 to 10%, the fractions are no longer accumulated and thus, the output from the lag circuit after the discharge of articles could never reach the level L and any error in count could never be introduced. FIG. 13(c) shows further embodiment in which the area of the rectangular pulse is made larger than the area of torque output T. Also in this embodiment the output from the first-order lag circuit after the passage of articles A through the measuring chute does not deviate towards the torque output T and thus, the counting error does not appear. In this manner in these embodiments using the first-order lag circuit, as long as the difference in area between the rectangular pulse and the torque output T is limited within a small range which might occur in usual counting operation, the integrated output corresponding to this difference is compensated to zero level within a small time interval and thus, the accurate counting can be always carried out.

In order to effect the accurate counting it is preferable that the area of the torque output T for the single article A is made similar to the area of the rectangular pulse. When articles to be measured are changed into different articles having different weights, the amplitude of the torque output T is changed in proportion to the weight of articles as can be seen from the equation (3). Then the area of the rectangular pulse generated from the mono-stable multivibrator has to be changed correspondingly. This may be achieved by constructing the measuring circuit in such a manner that by presetting the article weight, the area of the rectangular pulse is adjusted corresponding to the preset weight. In another method an indicator is connected to the output of the integrator 18 (if the first-order lag circuit is used, the circuit is altered into a pure integrating element by disconnecting temporarily the resistor across the capacitor), a relatively small number of articles are supplied to the measuring chute 4 one by one at a sufficiently large interval and the deviation of the output level of the integrator 16 from zero level is corrected, apparatus calibration is done easily.

For easy understanding the mono-stable multivibrator 18 is explained as a rectangular signal generator in the embodiment of FIG. 9, but according to the invention any other type of rectangular pulse generator may be equally used. Further the waveform to be supplied to the integrator 16 as differential input with respect to the torque output T can advantageously be the rectangular wave, because the circuit construction is made simpler and treatment is made easier. However it is not limited to the rectangular waveform, but may be another waveform such as a triangular waveform.

As explained above in detail the article counting apparatus according to the invention is superior to the known counting apparatus, is quite useful in industry and has the following advantages.

(1) Since the apparatus of the articles is discriminated by clear and abrupt change in torque produced upon the discharge of articles from the measuring chute, the counting can be carried out independent upon slight difference in shape, colour, transparency, attitude and weight of respective articles.

(2) Even if two or more articles pass through the chute simultaneously or with being twisted together, the accurate number of articles can be detected on the basis of the fact that the area of the torque output of these articles is equal to two or more times of the unit area of the torque output corresponding to the single article. Therefore, the total number of articles which have been supplied to the chute at a high rate can be obtained efficiently.

What is claimed is:

1. An apparatus for counting the number of articles comprising
   a measuring chute rotatably journalled to a horizontal shaft at its one end and being arranged in an inclined fashion so that the articles can slide therealong downwards due to gravity;
   a device for electrically measuring torque generated around said horizontal shaft when the articles pass through the measuring chute to produce a torque output; and
   a measuring circuit for receiving said torque output to count the number of articles by detecting a variation of the torque output due to the discharge of the respective articles from a lower end of the measuring chute remote from said horizontal shaft.

2. An apparatus according to claim 1, wherein said measuring circuit comprises a differentiating circuit for differentiating the torque output to produce pulsatory outputs of small width and an electronic counter for counting the number of pulses in said pulsatory output.

3. An apparatus according to claim 1, wherein said measuring circuit comprises a circuit for receiving said torque output to produce a first area signal representing an area of the torque output, a circuit for generating a second area signal representing an area of the torque output corresponding to a single article, a circuit for comparing said first and second area signals with each other to produce a signal representing the number of articles corresponding to the first area signal and for accumulating the number signal thus produced.

4. An apparatus according to claim 3, wherein said comparing and accumulating circuit comprises a circuit for generating a pulse signal having an area substantially equal to that of said second torque signal, a circuit for producing a difference between the areas of the first signal of torque and said pulse, a circuit for continuously generating said pulses as long as the area of torque output is large than the area of pulse signal, and a circuit for counting the number of pulses.

5. An apparatus according to claim 4, wherein said circuit for producing the difference between the areas of the torque output and pulse signal comprises an integrator for receiving at its differential inputs said first torque output signal and pulse signal, respectively.

6. An apparatus according to claim 4, further comprising a circuit for compensating the output from said circuit for reducing the difference between the first torque output and pulse signals to zero within a small time interval when the output from the circuit is sufficiently smaller than the area of the second torque signal.

7. An apparatus according to claim 6, wherein said compensating circuit comprises a first-order lag circuit having differential inputs for receiving the first torque output and pulse signals, respectively.

8. An apparatus according to claim 1, further comprising means for supplying the articles to be counted to the measuring chute at a position near said horizontal shaft.

9. An apparatus according to claim 1, further comprising at least one adjustable balance for balancing the measuring chute into a balanced condition.

* * * * *